(12) United States Patent
Salvan (10) Patent No.: US 8,973,935 B2
(45) Date of Patent: Mar. 10, 2015

(54) ONE-PIECE VEHICLE

(75) Inventor: Wally Salvan, Vichy (FR)

(73) Assignee: Incubateur d'Entreprises d'Auvergne, Saint Beauzire (FR)

( * ) Notice: Subject to any disclaimer, the term of this patent is extended or adjusted under 35 U.S.C. 154(b) by 65 days.

(21) Appl. No.: 13/508,387

(22) PCT Filed: Nov. 8, 2010

(86) PCT No.: PCT/FR2010/052394
§ 371 (c)(1),
(2), (4) Date: Aug. 24, 2012

(87) PCT Pub. No.: WO2011/055098
PCT Pub. Date: May 12, 2011

(65) Prior Publication Data
US 2012/0326473 A1  Dec. 27, 2012

(30) Foreign Application Priority Data

Nov. 9, 2009 (FR) ..................... 09 05370

(51) Int. Cl.
| | |
|---|---|
| *A61G 5/02* | (2006.01) |
| *A61G 5/10* | (2006.01) |
| *B60F 3/00* | (2006.01) |
| *B62B 19/04* | (2006.01) |

(52) U.S. Cl.
CPC .. *A61G 5/02* (2013.01); *A61G 5/10* (2013.01); *B60F 3/0061* (2013.01); *B62B 19/04* (2013.01); *A61G 2005/1054* (2013.01); *A61G 2005/1091* (2013.01); *A61G 2203/723* (2013.01)

USPC ........................................................ 280/250.1

(58) Field of Classification Search
CPC .............. A61G 5/10; A61G 2005/128; A61G 2005/1054
USPC ............................................ 280/250.1, 304.1
See application file for complete search history.

(56) References Cited

U.S. PATENT DOCUMENTS

| 5,028,065 A | 7/1991 | Danecker |
| 6,786,496 B2 * | 9/2004 | Ward et al. ................. 280/250.1 |
| 2006/0097562 A1 | 5/2006 | Hiruta et al. |

FOREIGN PATENT DOCUMENTS

| EP | 1666014 A2 | 6/2006 |
| FR | 2556587 A1 | 6/1985 |
| WO | 8803399 A1 | 5/1988 |
| WO | 2004108046 A1 | 12/2004 |

* cited by examiner

*Primary Examiner* — Joseph Rocca
*Assistant Examiner* — Felicia L Brittman
(74) *Attorney, Agent, or Firm* — Dowell & Dowell, PC (57) ABSTRACT

The invention relates to a vehicle (1) including a user seat comprising a backrest (3), a seat portion (4) and lateral edges (5) provided on both sides of the seat portion. The vehicle has a reduced production cost and a structure that facilitates the adaptation thereof to a plurality of activities, in particular owing to the fact that the seat, which is made from plastic, is produced in the form of a single piece, the lateral edges (5) being extended downwards such as to form two rear conduits intended to receive at least one rear movement member (26, 27, 28). The invention also relates to a vehicle production method in which rotational molding is used to form an ergonomic seat.

15 Claims, 11 Drawing Sheets

ONE-PIECE VEHICLE

BACKGROUND OF THE INVENTION

1. Field of the Invention

The present invention relates to the technical field of vehicles. The present invention in particular relates to vehicles that can be used by able-bodied or physically handicapped people, for example for sports and recreation activities.

2. Brief Description of the Related Art

Recreational chairs for physically handicapped people who for example move around in a wheelchair are generally complex and expensive products. Vehicles, such as wheelchairs, for example, with a structure particularly adapted to playing a sport, such as basketball, rugby, tennis, or a water sport, are generally made with a tubular metal structure. Furthermore, the vehicles used for athletic or recreational activities are generally specific to a particular activity. The relatively high manufacturing cost of these vehicles naturally limits their use to physically handicapped people who are very interested in a specific activity. There is therefore a need to reduce the cost of the vehicles used by physically handicapped people. There is also a need to develop and facilitate access by the entire public to activities or recreation done in a vehicle, for people with or without physical handicaps. Lastly, there is also a need for the vehicles to be adaptable to several activities.

SUMMARY OF THE INVENTION

The aim of the present invention is to offset one or more of the drawbacks of the prior art by proposing a vehicle having a reduced production cost and having a structure facilitating its adaptation to several activities.

The invention therefore relates to a vehicle including a user seat comprising a backrest, a seat portion and lateral edges provided on both sides of the seat portion, the seat, which is made from plastic, being produced in the form of a single piece, the lateral edges being extended downwards so as to form two rear conduits intended to receive at least one rear movement member, characterized in that the seat is hollow.

The rear conduits are for example provided facing one another and for example each have one end on each side of the seat portion.

Advantageously, non-limitingly, shock-absorbing gel or foam pouches, such as the pouches used for bicycle seats, can be adhered on the plastic surfaces of the seat to improve the ergonomics and comfort thereof. Non-limitingly, other shim or shock-absorbing means can also be adhered on the seat. Advantageously, seats may be produced, for example in large quantities, in several standardized sizes.

According to one particular feature, the seat portion comprises a front support surface extended by a rear support surface positioned at a lower level relative to the front support surface, said two support surfaces being attached to the lateral edges by rounded surfaces, the lateral edges having a particular height relative to one of the support surfaces of the seat portion so as to support the abductor muscles of the thighs and gluteus maximus muscles of the user. The front and rear support surfaces of the seat portion are for example made to be flat and attached to one another by a rounded height difference. The level gap between the front and rear support surfaces of the seat portion is for example comprised between 0.5 cm and several centimeters. The height of the lateral edges arranged on the sides of the seat portion is for example comprised between 3 cm and 20 cm. Of course, these values are provided solely for information and depend on the diameter of the wheels of the vehicle. The lateral edges are for example in contact with the user as far as mid-thigh. The gluteus maximus muscles also bear on a rounded surface at the back of the seat portion.

According to one particular feature, the seat portion is attached to a lower portion of the backrest, said lower portion including a withdrawn surface relative to a support surface of an upper portion of the backrest whereof the corners are rounded for user comfort during rotations, the support surface of the upper portion of the backrest being positioned so as to support the lumbar region, the withdrawn surface of the lower portion being arranged so as to free the lumbar vertebrae and the sacrum of the user. The gap between the withdrawn surface and the upper support surface is for example from one to several centimeters.

According to one particular feature, the seat includes a lower platform including two downwardly-oriented front conduits intended to receive at least one front movement member, a rounded bumper partition delimiting the lateral and front sides of the lower platform. The front and rear conduits for example have a cylindrical cross-section and both of the ends thereof may be open.

According to one particular feature, the lower platform comprises a recess formed by at least one footrest for the user's feet completely surrounded by a peripheral rim delimiting the recess. The feet are thus protected and positioned at a specific location in the vehicle. The front conduits intended to receive at least one front movement member are for example arranged on either side of the recess.

According to one particular feature, the edge delimiting the recess includes a rear portion extended by a partition joining a front edge of the seat portion, the front edge of the seat portion being positioned in front of the rear portion of the edge delimiting the recess. The user advantageously has a usage position of the vehicle with his heels behind his knees, which for example facilitates movements to lean forward, or forward and backward efforts made with the arms. The gap between the front edge of the seat portion and the rear of the peripheral edge delimiting the recess is for example from several centimeters to several tens of centimeters.

According to one particular feature, the front edge of the seat portion includes two backward curves for positioning the user's legs, said two backward curves being attached by a forwardly-curved middle portion, said middle portion also including a portion protruding over the top, said protruding portion including two rounded concave portions for supporting the adductor muscles of the user's thighs.

According to one particular feature, the vehicle comprises blind threaded housings embedded in the seat, provided laterally relative to the seat portion, said threaded housings being provided on either side of the back of the seat portion and being intended for the fastening of a belt or strap for holding the user's groin or abdominal muscles, or these housings being arranged on either side of the front of the seat portion and being intended to fasten a belt or strap for holding the user's knees.

Currently, the blind threaded housings are embedded outside the seat portion to avoid any friction. Furthermore, the belt can assume the form of an elastic harness for users no longer able to use the lap belt. Heightwise maintenance of the knees relative to the front edge of the seat portion advantageously blocks the user's feet in the footrest recess and thereby avoids the use of foot straps.

According to one particular feature, the lateral edges extend downwards so as to form two rear conduits, forming flat outer lateral surfaces, the seat comprising ears extending heightwise and on the sides, and formed on the lower platform and against the flat outer lateral surfaces, the ears each comprising a conduit for an accessory oriented from front to back done at a particular level such that the upper portion thereof is at the same level as the lower portion of the rear conduits. The flat outer surfaces in the extension of the lateral edges in particular make it possible to facilitate storage of the seats placed head to tail and in contact by their flat outer surfaces.

The conduits in the ears can for example be used for the insertion of two bars on each side of the seat, protruding toward the front and back of the vehicle and pressing on a bar maintained in the rear conduits. These two bars on each side of the seat for example make it possible to carry the vehicle using the sedan chair principle. Furthermore, the ears can advantageously be equipped with blind threaded housings embedded in the seat, for example to install braking members cooperating with the back wheels.

According to one particular feature, the rear movement member comprises two back wheels and a bar maintained in the rear conduits, said bar being equipped at each of its ends with a member for locking the translation of the bar and hinging one of the wheels, the lateral edges positioned on each side of the seat portion having an upper profile along the contour of one of the wheels over a particular angular portion for example comprised between 15° and 75°, two front movement members each including at least one steerable front wheel.

According to one particular feature, the back wheels each comprise an outer rolling ring made from molded plastic, connected to said hinge member by fins bearing on the water narrowing in a junction portion with the outer rolling ring so as to leave an empty space opposite the guide shoe of said wheel, the seat comprising, under the seat portion, a boss in which an open hollow plug is made toward the front and a handle made behind the backrest, a float for stabilizing the vehicle in the water being attached to said handle and the hollow plug. Once the vehicle is out of the water, the user can for example travel on the ground. On the other hand, the handle not used by the float could be used as a gripping means of the seat, for example by a person not seated in the vehicle.

According to one particular feature, the vehicle comprises two rear movement members each comprising a snow ski secured, by a rod, to a cylindrical portion hinged in one of the rear conduits, said rod being secured on the other hand to a branch rising above the seat and ending with a handle for steering said back ski, to front movement members each comprising at least one front snow ski. Advantageously, this type of vehicle can be used as a luge or a sled.

According to one particular feature, the rear movement member comprises two water skis, the front movement member comprising at least one front water ski, arranged under the vehicle in the middle. Advantageously, this type of vehicle can be used by being pulled by a motor boat or a kite, such as a wing used for kite surfing.

The invention also relates to a method for producing a vehicle according to the invention, characterized in that the seat is made to be hollow by rotational molding.

According to one particular feature, one or more partition portions of the seat are used to mark a raised inscription or drawing. A mark, registration number, or identifier is for example inscribed in the mass of the seat, behind the backrest.

BRIEF DESCRIPTION OF THE DRAWINGS

Other features, advantages, and details of the invention will be better understood upon reading the rest of the following description of embodiments provided as examples, in relation to the drawings, in which.

DESCRIPTION OF THE PREFERRED EMBODIMENTS

Figure 1:
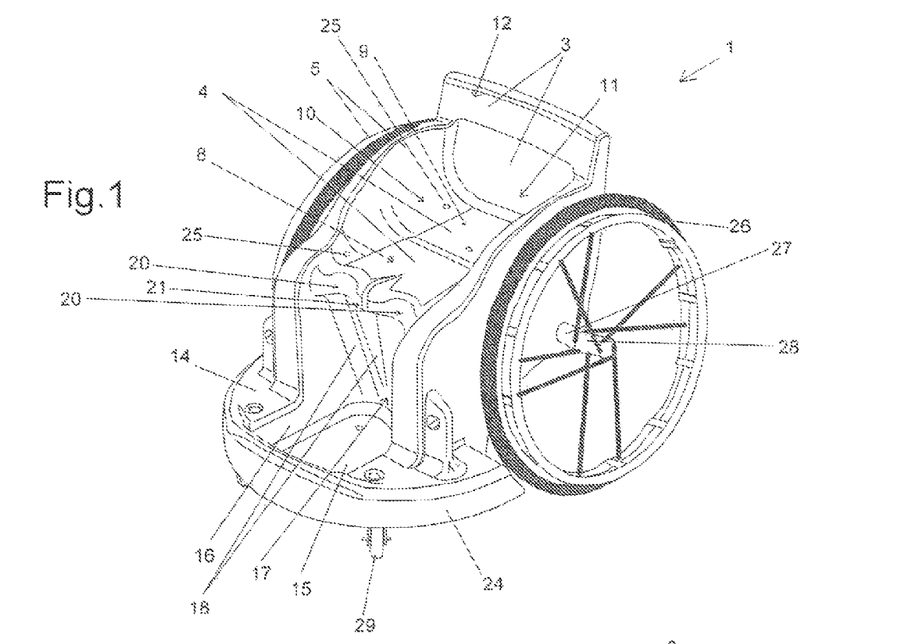
FIG. 1 is a front perspective view of one example of a vehicle according to the invention.
Figure 2:
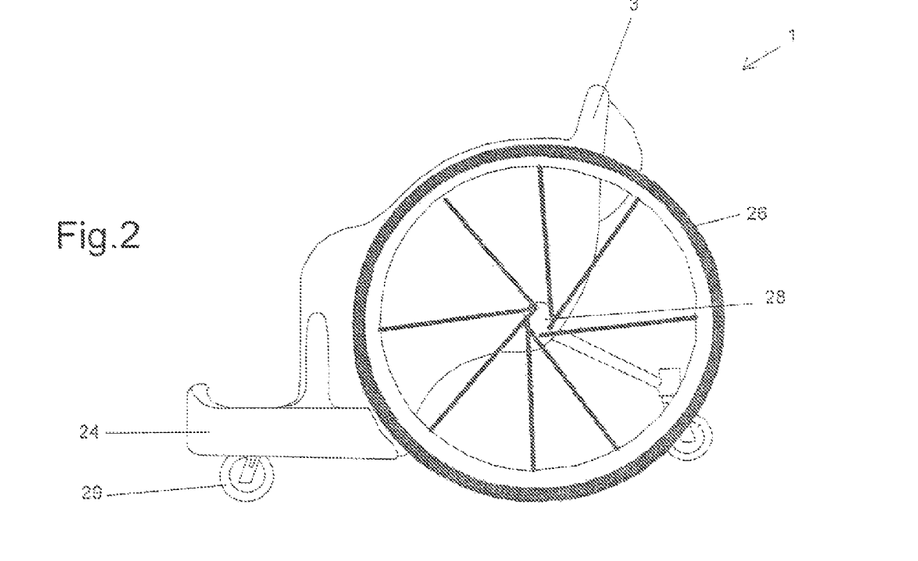
FIG. 2 is a side view of the vehicle.

The invention will now be described. The vehicle 1, as shown in FIG. 1, comprises a user seat, the seat comprising a backrest 3, a seat portion 4, and lateral edges 5 provided on either side of the seat portion. The backrest 3 can alternatively receive a lift whereof the height can be adjusted, improving holding of the person. The seat 2, made from plastic, is made in a single piece, the lateral edges 5 being extended downward so as to form two rear conduits 6 intended to receive at least one rear movement member, referenced 26, 27 and 28, or 34, 35 and 36, or 58, 59 and 40. The two rear conduits 6 intended to receive at least one rear movement member are for example made in the form of cylindrical through openings.

The molded plastic seat is for example hollow and sealed so as to be able to float. Furthermore, the plastic seat is easy to wash or disinfect. Different colors or matte or shiny appearances can for example be produced.

The seat is for example made in series of different sizes. The sizes are for example produced as a function of different wheel sizes, or in inches 22', 24' and 26'.

The seat 2 is for example made to be hollow using a rotational molding-type method. Using such a method, it is possible to incorporate a heating device, for example an electric resistance, into the seat. Thus, by using a thermoformable polymer, each user, by heating the seat beforehand using the electric resistance, leaves an imprint of his body in the seat and shapes the seat to his morphology. In other words, using a heating device for a thermoformable polymer makes it possible to create a seat adapted to each user.

Figure 6:
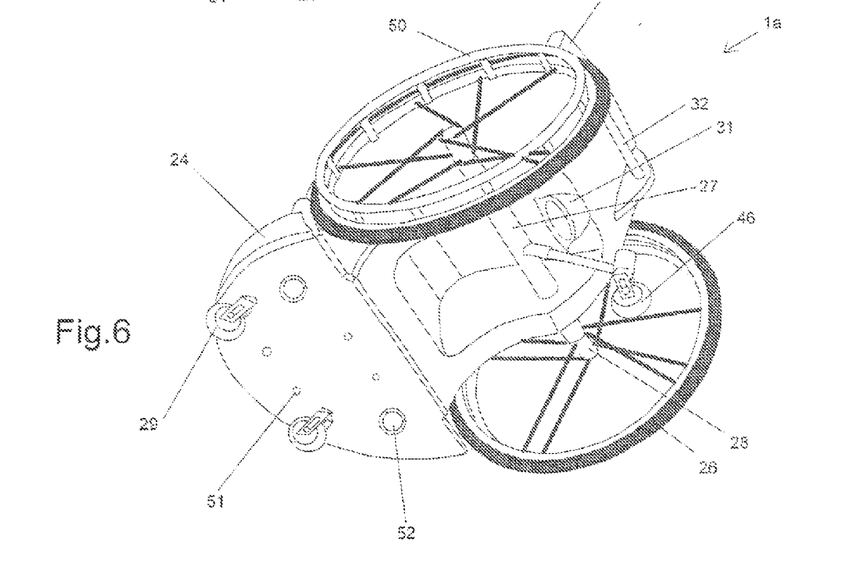
FIG. 6 is a perspective view of one alternative embodiment of the bottom of the vehicle.

A hollow seat filled with air in particular makes it possible to lighten the seat, but it is also possible to use a solid plastic seat or a hollow seat filled with a reinforcing foam or foam improving floating. As shown in FIG. 6, stoppers 52 for example close openings formed in the hollow shell making up the seat 2. These stoppers 52 can for example be screwed around a thread of a lower partition of the seat 2. Alternatively, by removing these stoppers, a ballast can be introduced into the seat allowing subaquatic use thereof, for example for rehabilitation. These openings are for example left open to allow air to circulate, or are for example closed to seal the shell of the seat 2. The air for example circulates when the shell is heated or cooled and the shell is not sealed. The conduits, referenced 6 or 22, rear and front, for receiving one or more movement members for example have a sealed inner partition.

According to one non-limiting embodiment, through openings 55 for discharging water are for example formed in the seat portion 4.

Through openings formed in the seat for example have a solid and sealed, or even reinforced, inner partition so as to preserve the sealing of the hollow seat.

In this description, certain parts of the vehicle will be designated as being behind or in front of, or at the top or bottom of the vehicle, or on the lateral sides of the vehicle, these indications corresponding to a flat position of the vehicle in which the user, bearing on the seat portion and the backrest, is facing forward. These positions of the vehicle and the user are not, however, limiting. The vehicle may for example tilt back or lean to the side. The user can for example lean or turn his torso.

Wheels of the vehicle are for example shown with only several spokes for clarity reasons in the drawings, but the wheels may comprise a sufficient number of spokes to be strong enough. Stick or solid wheels can also be used.

Figure 7:
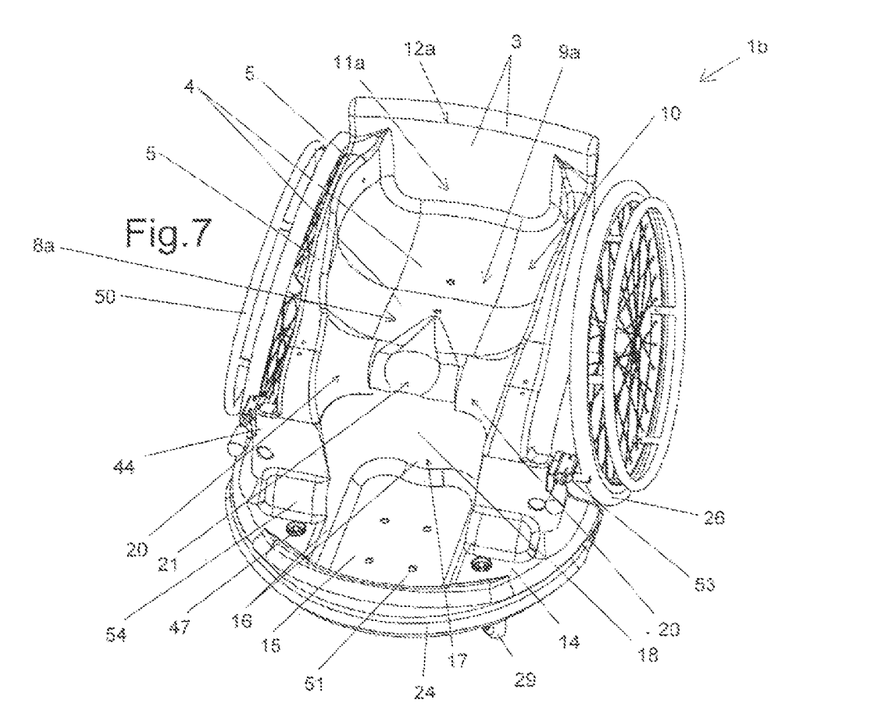
FIG. 7 is a perspective view of the front of one example of a vehicle according to the invention.

The seat portion 4 for example comprises a front support surface, referenced 8 or 8a, extended by a rear support surface, referenced 9 or 9a, positioned at a lower level relative to the front support surface, said two support surfaces being attached to the lateral edges 5 by rounded surfaces 10. The height of the lateral edges 5 is for example determined relative to one of the support surfaces of the seat portion so as to support the abductor muscles of the thighs and gluteus maximus muscles of the user. Non-limitingly, the front and rear support surfaces, referenced 8 and 9, of the seat portion 4 can be flat, as shown in FIG. 1. The front and rear support surfaces, referenced 8a and 9a, can also be rounded, as shown in FIG. 7.

The user thus has a large contact surface with the seat portion. Furthermore, the height difference for example makes it possible to shift the user backward, this feature of the ergonomics of the seat portion 4 allowing good seating for users with different thigh and buttock sizes. Furthermore, the rounded lateral surfaces 10 make it possible to adapt a same seat width to users with different hip sizes. Different seat sizes can for example be made, each adapting to users with different measurements.

Figure 8:
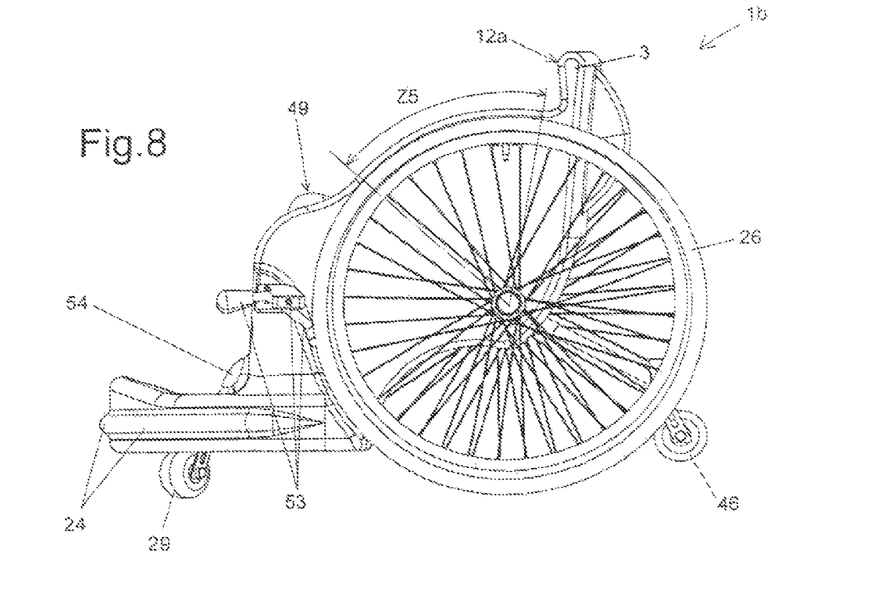
FIG. 8 is a side view of the vehicle of FIG. 7.
Figure 21:
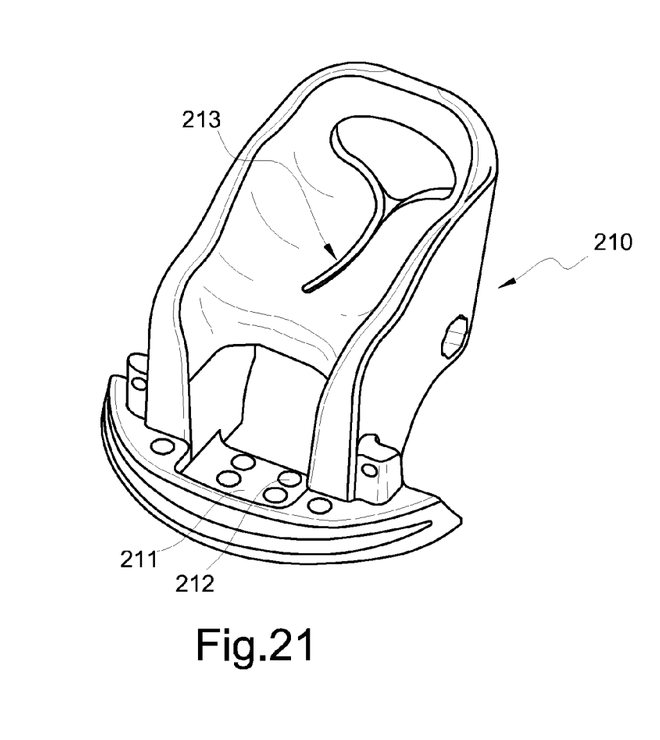
FIGS. 21 and 22 are general and side views, respectively, on another scale, of another embodiment of the seat.

The seat portion 4 is for example attached to a lower portion, referenced 11 or 11a, of the backrest 3, said lower portion comprising a withdrawn surface relative to a support surface of the upper portion, referenced 12 or 12a, of the backrest 3. The support surface of the upper portion, referenced 12 or 12a, of the backrest 3 is for example arranged so as to support the lumbar region of the user. As illustrated in FIG. 21, a slot 213 formed in the seat portion of the seat makes it possible to limit the pressure exerted by the seat on a probe equipping the user of the vehicle. The withdrawn surface of the lower portion, referenced 11 or 11a, is for example arranged so as to free the sacrum and the lumbar vertebrae of the user. The withdrawn and support surfaces 11 and 12 made in the backrest 3 are for example in the shape of a cylinder portion, as shown in FIG. 1. The withdrawn and support surfaces, referenced 11a and 12a, made in the backrest 3 can also be produced using more complex shapes forming more continuous orientation variations. The backrest 3 for example includes, as shown in FIG. 8, a wider upper portion, then gradually narrows toward the bottom of the backrest 3.

The seat for example comprises a lower platform 14 including two front conduits 22 oriented downward intended to receive at least one front movement member, referenced 29, 42 or 39. The two front conduits 22, intended to receive one or more movement members, are for example made in the form of a cylindrical through opening.

A rounded bumper partition 24 for example delimits the lateral and front sides of the lower platform 14, which, non-limitingly, is in the shape of a half-circle seen from above. The bumper 24 is for example raised at the front, for example to improve protection at the front of the bumper. The bumper for example includes a peripheral reinforcing bead.

It would not go beyond the scope of the invention for the vehicle to include a front portion including a footrest and connecting means with at least one front movement member, said front portion for example being secured on a plastic single-piece seat. However, this front portion is advantageously integrated into the seat.

In one embodiment not illustrated, at least the bumper 24, advantageously the entire platform 14, is removably fastened on the seat 2. This fastening is for example done by a combination of guideways and rods.

The lower platform 14 for example comprises a recess formed by at least one footrest 15 for the user's feet completely surrounded by a peripheral edge 16 defining the recess. The height of this recess is for example comprised between 3 cm and 20 cm.

Figure 4:
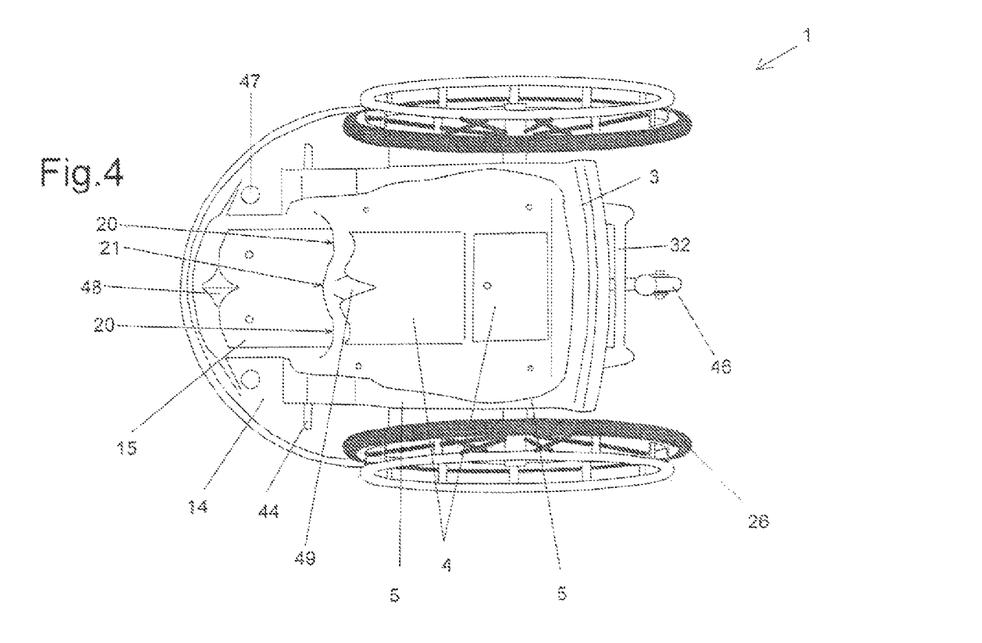
FIG. 4 is a top view of the vehicle.
Figure 5:
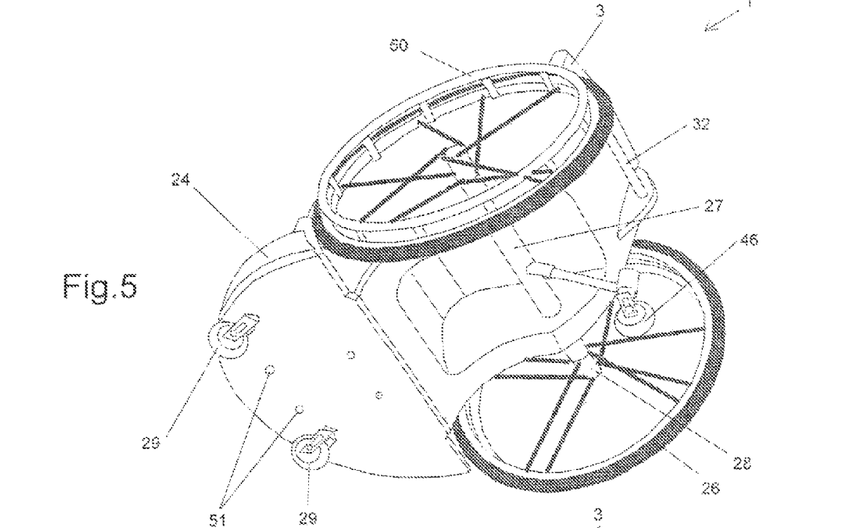
FIG. 5 is a perspective view of the bottom of the vehicle.
Figure 9:
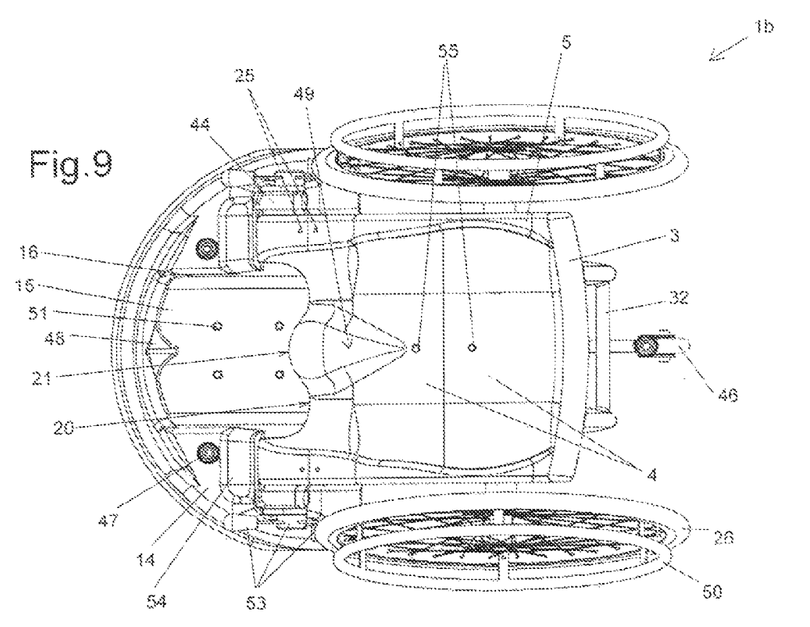
FIG. 9 is a top view of the vehicle of FIG. 7.
Figure 14:
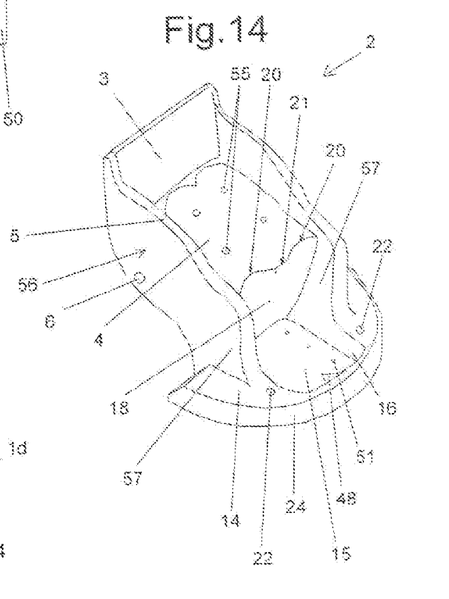
FIG. 14 is a perspective view of one example of a vehicle seat according to the invention.
Figure 15:
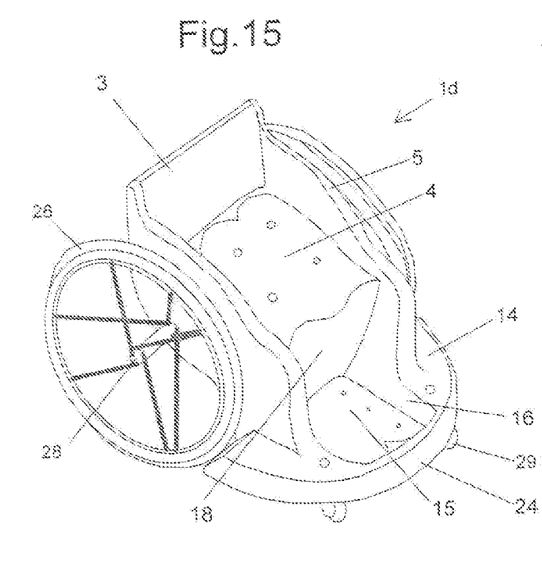
FIGS. 15 to 18 show perspective views of a vehicle according to the invention manufactured with the seat of FIG. 14.

The user's feet are advantageously kept in this protected space. As illustrated in FIG. 4 or FIG. 9, a protruding portion 48 arranged on the floor 15 at the front and middle of the recess for example makes it possible to divide the recess into two spaces, one for each of the user's feet, but also to reinforce the bumper through rear supports. The peripheral edge 16 delimiting the recess in particular allows lateral maintenance of the feet. According to one non-limiting example embodiment, through openings 51 for discharging water can for example be made in the floor 15. As indicated in FIG. 14, lateral portions 57 can also be positioned above and on each side at the back of said peripheral edge 16, for example to block or protect the user's legs. These lateral portions 57 integrated into the seat 2 for example form protective and blocking partitions for the user's legs.

The seat 2 integrating the lower platform 14 for example comprises partitions descending toward the front, from the seat portion 4 and the edges 5, to the lower platform 14. Non-limitingly, reinforcing beads 54, integrated into the seat 2, are for example positioned at the front of these connecting partitions and on the lower platform 14.

The edge delimiting the recess for example includes a rear portion 17 extended by a partition 18 joining a front edge, referenced 20 and 21, of the seat portion 4, the front edge of the seat portion being positioned in front of the rear portion 17 of the edge 16 delimiting the recess. In this way, the user's heels are positioned behind his knees. This position is advantageous to produce forces with the arms. That effort is made easier and the range of motion is increased. Furthermore, the position of the user tilted forward favors the user's balance when the vehicle moves forward. Furthermore, a space that may be arranged between a footrest portion and the seat portion is completely closed, thereby eliminating any risk of the user's feet sliding under the vehicle. The lateral partitions 57, protecting the users calves, for example also make it possible to close that space.

The front edge, referenced 20 and 21, of the seat portion 4 for example includes two backward curves 20 for positioning the user's legs, said two backward curves 20 being attached by a middle portion 21 curved forward. This middle portion 21 for example also comprises a top protruding portion 49, said protruding portion 49 including two rounded concave portions for supporting the adductor muscles of the user's thighs.

The vehicle for example comprises blind threaded housings 25 integrated into the outside of the seat, provided laterally relative to the seat portion 4. Said threaded housings 25 are for example provided on either side of the back of the outside of the seat portion and are for example intended to secure a belt 60 or strap for holding the groin or abdominal muscles of the user. These threaded housings 25 can also be positioned on either side of the front of the seat portion 4 and are for example intended to fasten a belt 61 or a strap for holding the user's knees. Advantageously, the user can be held in the seat by one or more belts. The holding of the knees, by pressing the front of the thighs against the seat portion, for example makes it possible to prevent the feet from leaving their housing.

The lateral edges 5, by extending downwards so as to form the two rear conduits 6, for example form flat outer lateral surfaces 56. These flat outer surfaces 56 for example extend on the side of the partitions 57 for protecting the legs.

Figure 13:
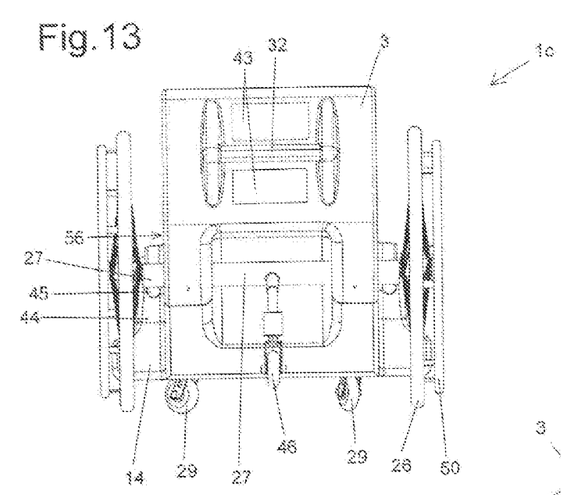
FIG. 13 is a back view of one example of a vehicle according to the invention.

The seat for example comprises ears 44 that extend heightwise and on the sides and are for example formed on the lower platform 14 and against the flat outer lateral surfaces 56. The ears for example each comprise a conduit 45 for an accessory, oriented from front to back, said conduit 45 being made at a particular level so that the upper portion thereof is at the same level as the lower portion of the rear conduits, as shown in FIG. 13. This conduit in each ear, for example cylindrical and going all the way through, for example makes it possible to slide a bar therein also passing under a rear bar maintained the rear conduits 6. Two lateral bars thus connected to the vehicle for example make it possible to carry the vehicle, using the sedan chair principle. A rolling vehicle as shown in FIG. 13, or any other type of vehicle, can for example be lifted to pass over an obstacle.

Each ear 44 can thus make it possible to install a lighting device, for example including a direct-current generator bearing on one of the wheels.

The rear movement member for example includes two rear wheels 26 and a bar 27 maintained in the rear conduits 6, said bar 27 being equipped at each end thereof with a member 28 for locking the translation of the bar and hinging one of the wheels.

In one embodiment not illustrated, the ends of the bar 27 removably receive an extender inserted between the end of the bar 27 and the locking and hinge member.

This member is provided with an opening forming a housing for receiving the rotation shaft of the wheel. This opening is more or less inclined relative to the longitudinal axis of the bar 27. Thus, the wheel is inclined more or less, relative to the vertical, without touching the seat, owing to the extension. It is thus possible to have, for a given vehicle, a set of extenders and/or members with different openings so as to change the incline of the wheels of the vehicle.

The lateral edges 5 for example have an upper profile along the contour of one of the wheels over a particular angular portion, referenced Z5, as shown in FIG. 8. The upper portion of the lateral edges along the profile of the wheels for example extends over an angle comprised between 15° and 75°. The front movement members for example each comprise a steerable front wheel 29. The front wheel 29 is for example a castor hinged around a pin maintained by two branches spaced apart from one another and connected to a pin pivoting relative to the platform 14. This pin pivoting relative to the platform for example includes an upper fastening element 47 mounted by screwing.

Alternatively, the position of the front wheel 29 is adapted to allow a user to bear on the lower platform 14, without the vehicle tilting, for example to get up or sit down in the seat.

Figure 18:
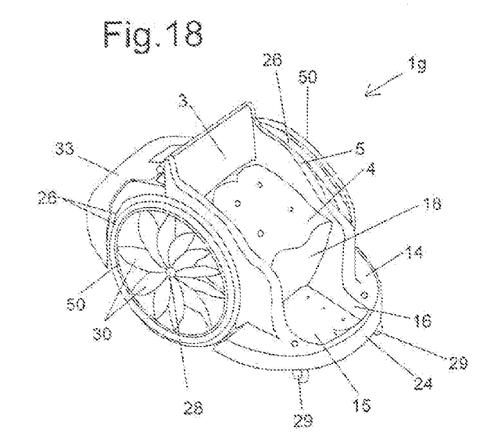

As shown in FIG. 18, the rear wheels 26 of the vehicle, referenced 1g, for example each comprise an outer rolling ring made from molded plastic, connected to said hinge member 28 by fins 30 bearing on the water. The wheels equipped with fins, rotating in the water, for example make it possible to move the floating vehicle forward in the water. Non-limitingly, the molded plastic wheels are for example obtained by rotational molding and are for example filled with foam. Even if the wheels are for example then made heavier, the foam allows them to float better. The fins 30 bearing on the water for example narrow in a junction portion with the outer rolling ring 26, so as to leave the free space opposite the guide shoe 50 of that wheel. The seat for example includes, under the seat portion 4, a boss 31 in which a hollow plug open to the front is made and a handle 32 formed behind the backrest 3. A float 33 for stabilizing the vehicle in the water is for example fastened to said handle 32 and the hollow plug. A hollow plug is for example shown on the vehicle, referenced 1a, shown in FIG. 6.

Figure 16:
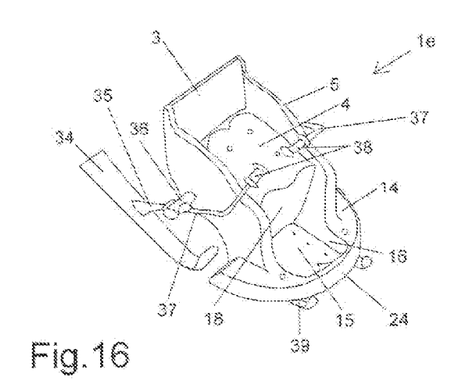

As shown in FIG. 16, the vehicle, referenced 1e, for example includes a plurality of rear movement members each including a snow ski 34 fastened, by a rod 35, to a cylindrical portion 36 hinged in one of the rear conduits 6. This rod 35, for example made from aluminum or resin, is for example fastened on the other hand to a branch 37 rising above the seat and ending with a handle 38 for steering the ski. This branch 37 is for example made from aluminum or resin. Each front movement member for example comprises at least one front snow ski 39. The front skis 39 are for example smaller than the rear skis 34. The user can for example use this vehicle, referenced 1e, in the same way as a luge or sled.

Alternatively, the vehicle comprises only one ski fastened on the rear conduits of the vehicle.

Irrespective of the type of vehicle produced, referenced 1, 1a, 1b, 1c, 1d, 1e or 1g, belts, referenced 60 or 61, can for example be fastened to the seat 2. A belt can also be replaced by a strap whereof the free end has a fastener intended to be secured on a fastening element, which in turn is fastened on a lateral portion of the seat portion 4.

Figure 17:
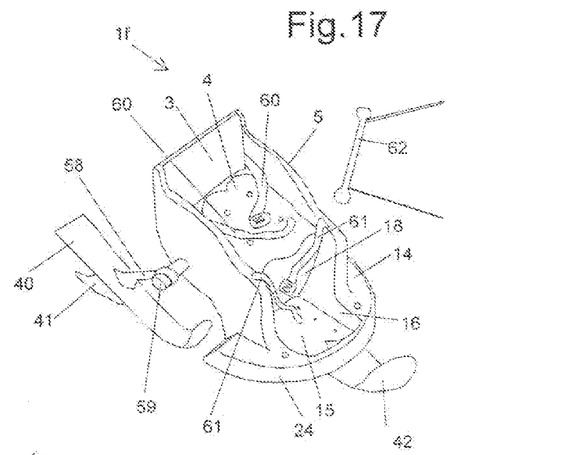

As shown in FIG. 17, the rear movement member for example comprises two water skis 40. The front movement members for example comprise connecting elements for connecting with a waterski going from front to back FIG. 42, provided under the middle of the vehicle. The water skis 40 are for example equipped with a fin 41 on the lower surface thereof. A rear ski 40 is for example connected, by an aluminum or resin branch 58, to a bar 59 supporting the seat 2 above the rear skis 40. The user for example grasps a gripping bar 62 that pulls him forward. The bar is for example pulled in turn by a motor boat or a kite, such as a kite surfing wing. The user can for example exert different forces on the right and left arms while leaning to one side to turn.

Advantageously, a same seat 2, like that shown in FIG. 14, can be used to produce:
  a vehicle, referenced 1d, moved by arm muscle power, or
  a vehicle, referenced 1e, traveling on snow, or
  a vehicle, referenced 1f, traveling on water, or
  a vehicle, referenced 1g, capable of moving forward on
    water or traveling on land, moved by arm muscle power.

The guide shoe 50 is for example used to exert action on the wheels, by arm muscle power.

Figure 3:
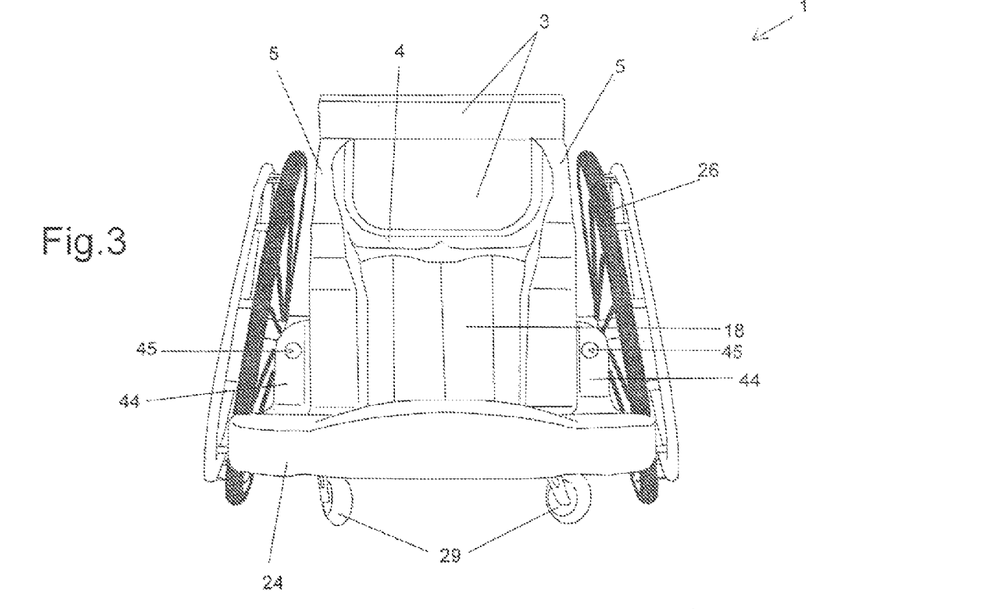
FIG. 3 is a front view of the vehicle.
Figure 10:
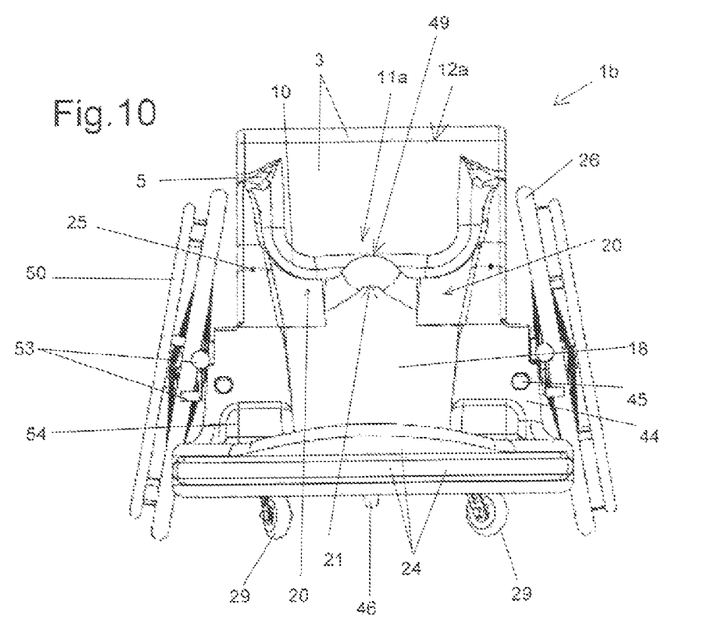
FIG. 10 is a front view of the vehicle of FIG. 7.

Non-limitingly, the vehicle is equipped with rear wheels 26 for example have straight wheels as on the vehicle, referenced 1c, shown in FIG. 13, or wheels whereof the upper portion is tilted toward the seat as in the vehicles, referenced 1b or 1, shown in FIGS. 3 and 10. The wheels for example comprise a rim and a tire.

A vehicle equipped with rear wheels is for example equipped with braking members 53. A braking member 53 is for example secured in the blind threaded housings embedded in an ear 44 of the seat 2. The braking member 53 for example comprises a rod equipped, at one end close to the wheel, with a cylinder bearing on the wheel, and equipped, at the opposite end thereof, with a handle for activating or deactivating the brake. This rod is for example hinged around an element fastened to the seat 2.

Figure 11:
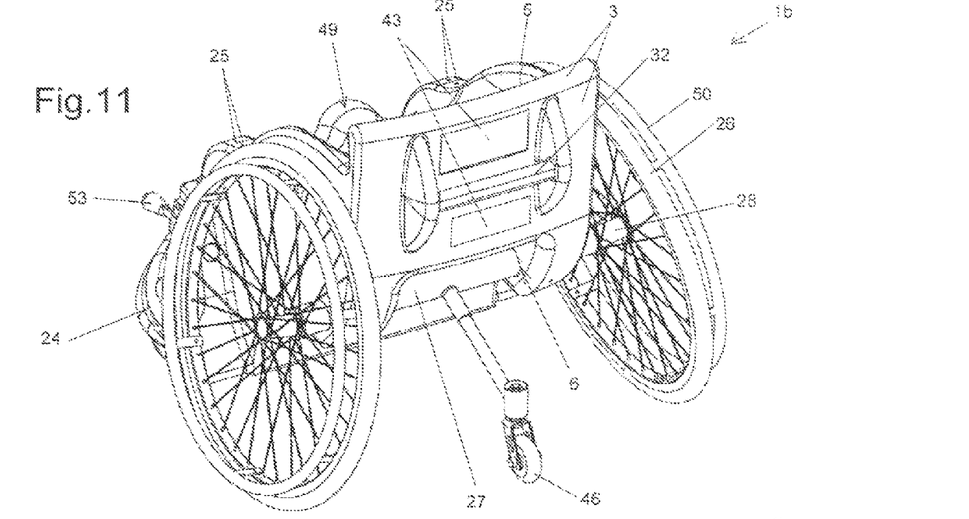
FIG. 11 is a perspective view of the back of the vehicle of FIG. 7.
Figure 12:
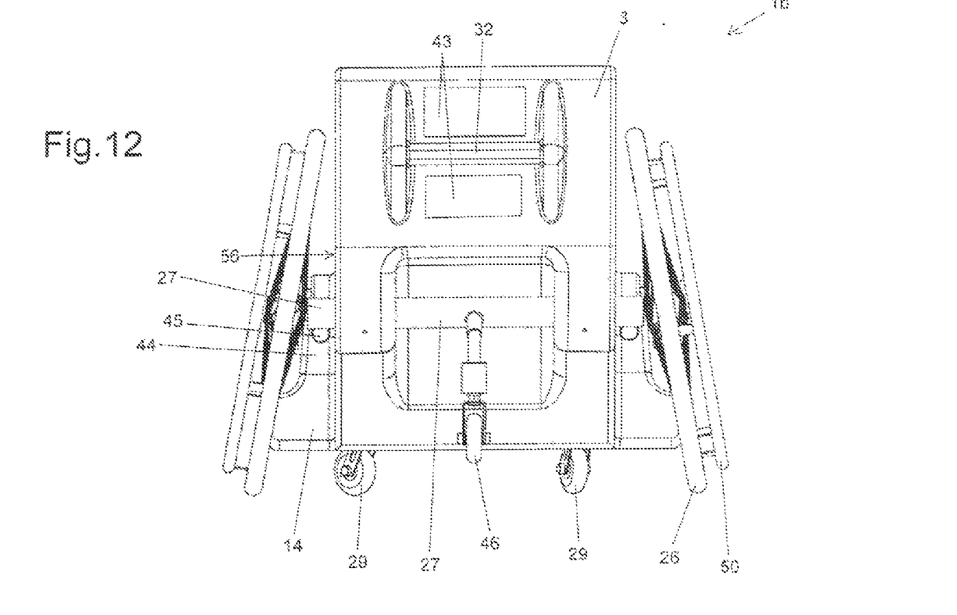
FIG. 12 is a back view of the vehicle of FIG. 7.

A vehicle equipped with rear wheels 26 is for example equipped with an anti-tilt rear castor 46, as shown in FIG. 11. The rear castor 46 is for example provided in a rear position relative to the seat and at a particular height such that it remains above the ground, when the vehicle is traveling on a flat surface bearing on its front and back wheels. A rod for positioning the anti-tilt castor 46 is for example secured to the rear bar 27 at the ends of which the hinge members 28 of the rear wheels are provided.

The method for manufacturing the seat 2 by molding, for example such as by rotational molding, advantageously makes it possible to use one or more partition portions 43 of the seat 2 to mark a raised inscription or drawing. This or these raised markings are for example done behind the backrest. A registration or identification number of the vehicle will for example thus be made tamper-proof.

Figure 19:
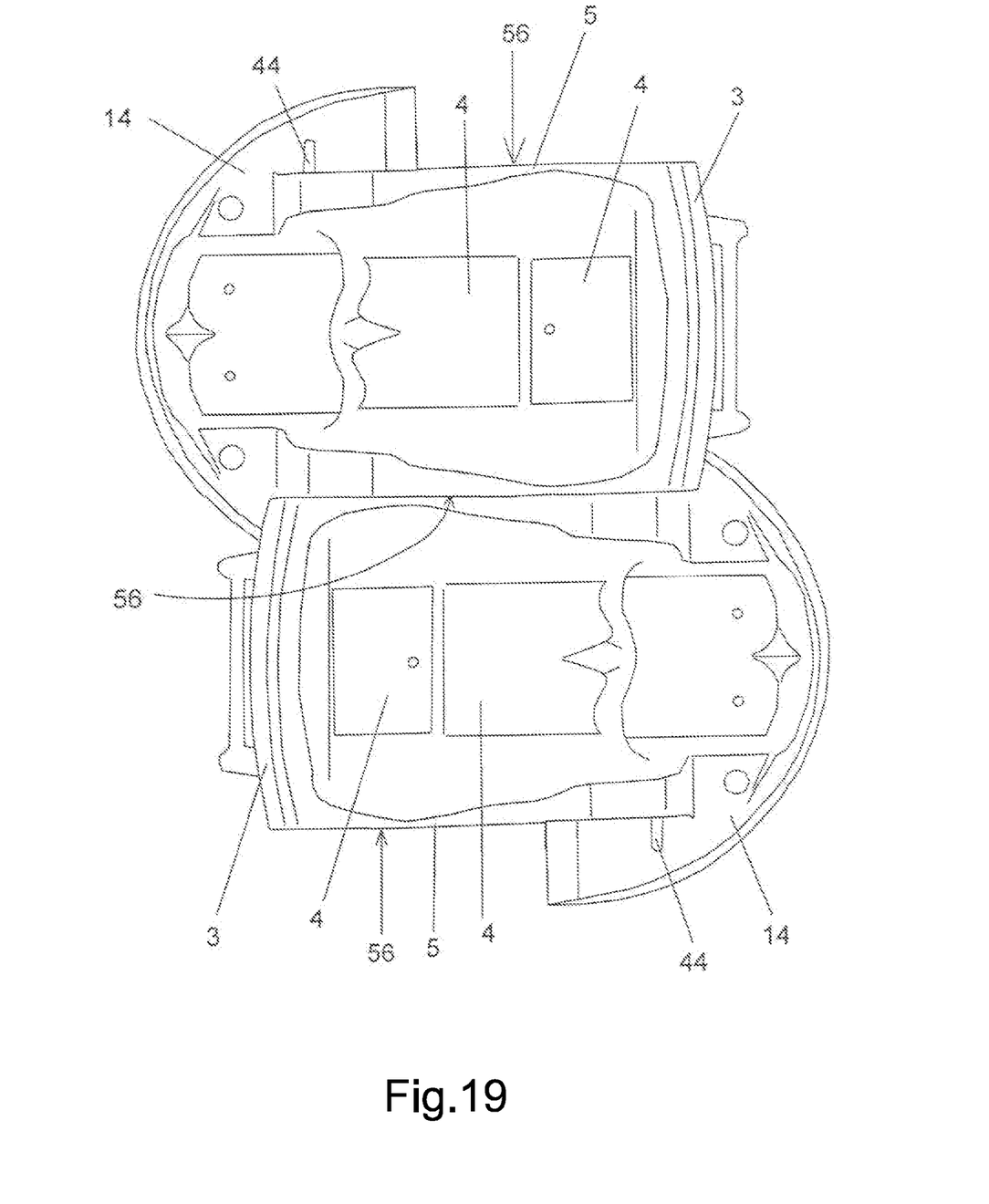
FIG. 19 is a top view showing one example of the storage of two seats according to the invention.

As shown in FIG. 19, the seats 2 provided with flat lateral surfaces 56 extending their lateral edges 5 can be stored edge to edge. Non-limitingly, the seats 2 are for example placed bearing on a corresponding flat lower front surface above the lower platform 14. The back bottom of the seat for example rests on a shim or a portion of a neighboring seat, such as in an ear 44 of the neighboring seat, for example.

The storage of two seats 2, as shown in FIG. 19, is not limiting, and three or four seats or more seats can for example be stored head to tail. A seat 2 provided between two other seats for example has both lateral surfaces 56 in contact with the two neighboring seats.

Figure 20:
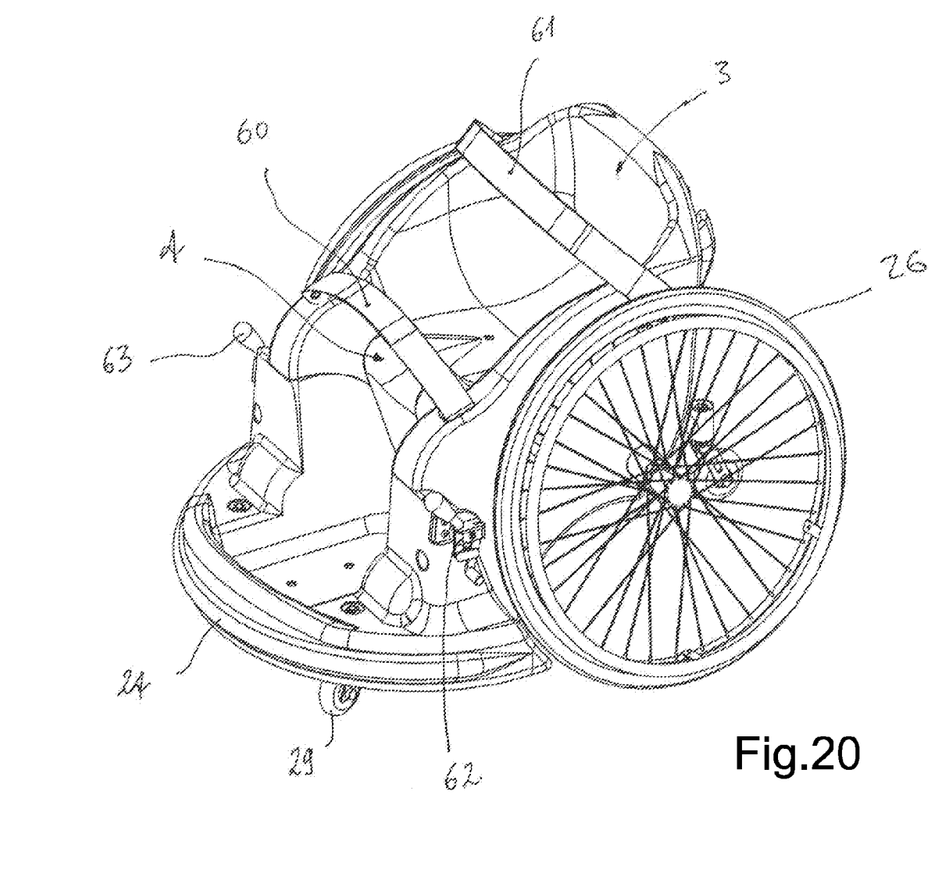
FIG. 20 shows a view of another embodiment of the vehicle.

FIG. 20 shows an alternative embodiment of the vehicle 1 equipped with two straps 60 and 61, of the winding type so as to immobilize the user on said vehicle. These straps 60 and 61 for example wind on a winder (not shown) integrated into the seat portion 4 of the vehicle, on the right side for example, and fastened on a fastener, for example on the left side. The vehicle is provided with a braking mechanism 62 of the wheel 26 and can be maneuvered using a handle 63.

FIG. 21 illustrates an embodiment of a seat 210 whereof the platform 211 comprises openings 212 capable of receiving reliefs with a complementary shape secured on plates forming base plates for supporting the user's feet. These plates are not illustrated, for better legibility. Advantageously, these plates can be stacked, one of the surfaces thereof being provided with openings, and the opposite surface being equipped with reliefs. In this way, the height of each movable footrest formed by the plates can be adjusted individually.

Figure 22:
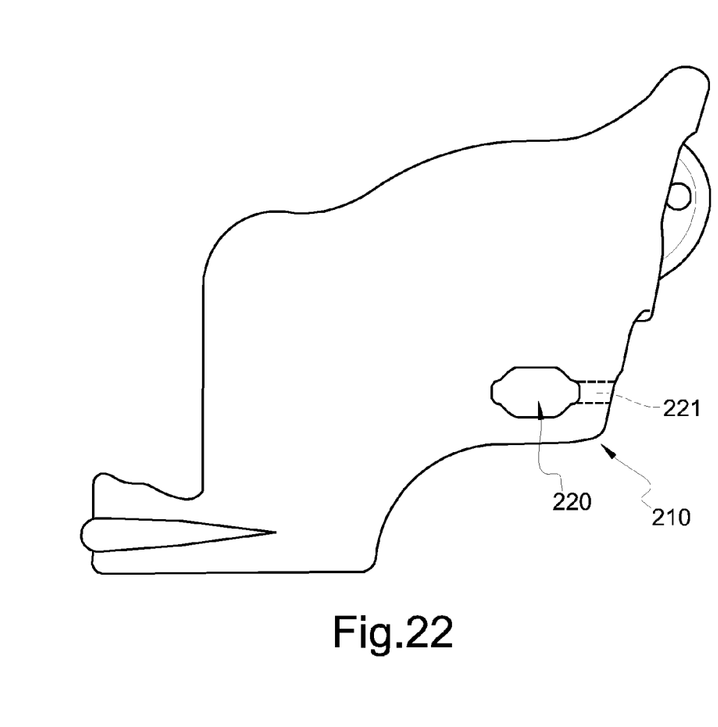

FIG. 22 is a side view of the seat illustrated in FIG. 21. A cutout 220 allows a translational movement, from front to back along double arrow F, of the seat 210 relative to the bar 27 connecting the rear movement members. The movement is done using an adjusting device known in itself, for example a worm, not shown, inserted into a housing 221.

In one alternative not illustrated, the vehicle is provided with brakes, equipping at least one of the movement members, controlled by a set of flexible cables, which can be maneuvered directly by the user. Advantageously, the user has a handle, similar to a bicycle handle, mounted at the end of the brake cables to actuate them.

The different ergonomic shapes of the seat make it possible to improve comfort and facilitate use thereof. The ergonomic shapes of the seat also allow it to be used by people with physical handicaps. The ergonomic shapes of the seat in particular make it possible to decrease bedsore risks by multiplying the support surfaces for the user on the seat. These good ergonomics also make it possible to increase comfort, and therefore the usage duration of the vehicle, for example during sports practice.

It should be obvious to one skilled in the art that the present invention allows for other alternative embodiments. As a result, these embodiments must be considered an illustration of the invention defined by the appended claims.

The invention claimed is:

1. A vehicle comprising a user seat, the seat including a backrest, a seat portion and lateral edges provided on both sides of the seat portion, the seat, which is made from plastic, being produced in the form of a single piece, the lateral edges being extended downwards so as to form two rear conduits for receiving at least one rear movement member, wherein the lateral edges, by extending downwards so as to form the two rear conduits, form flat outer lateral surfaces, the seat including ears extending heightwise and on the sides, and formed on a lower platform of the seat and against the flat outer lateral surfaces, the ears each including a conduit for an accessory oriented from front to back at a level such that an upper portion thereof is at a same level as a lower portion of the rear conduits and in that the seat, which is hollow, is adapted to receive a device for heating a thermoformable component polymer of the seat so as to produce a seat adapted to a user.

2. The vehicle according to claim 1, wherein the seat portion includes a front support surface extended by a rear support surface positioned at a lower level relative to the front support surface, the two support surfaces being attached to the lateral edges by rounded surfaces, the lateral edges having a height relative to one of the support surfaces of the seat portion so as to support abductor muscles of thighs and gluteus maximus muscles of a user.

3. The vehicle according to claim 1, wherein the seat portion is attached to a lower portion of the backrest, the lower portion including a withdrawn surface relative to a support surface of an upper portion of the backrest, the support surface of the upper portion of the backrest being positioned so as to support a lumbar region, the withdrawn surface of the lower portion being arranged so as to free lumbar vertebrae and sacrum of a user.

4. The vehicle according to claim 1, wherein the seat includes a lower platform including two downwardly-oriented front conduits for receiving at least one front movement member, a rounded bumper partition delimiting the lateral and front sides of the lower platform.

5. The vehicle according to claim 4, wherein the lower platform includes a recess formed by at least one footrest for a user's feet completely surrounded by a peripheral rim delimiting the recess.

6. The vehicle according to claim 5, wherein an edge delimiting the recess includes a rear portion extended by a partition joining a front edge of the seat portion, the front edge of the seat portion being positioned in front of the rear portion of the edge delimiting the recess.

7. The vehicle according to claim 6, wherein the front edge of the seat portion includes two backward curves for positioning a user's legs, the two backward curves being attached by a forwardly-curved middle portion, the middle portion also including a portion protruding over the top, the protruding portion including two rounded concave portions for supporting adductor muscles of a user's thighs.

8. The vehicle according to claim 4, wherein the vehicle includes blind threaded housings embedded in the seat, provided laterally relative to the seat portion, the threaded housings being provided on either side of the back of the seat portion for the fastening of a belt or strap for holding a user's groin or abdominal muscles.

9. The vehicle according to claim 4, wherein the rear movement member includes two back wheels and a bar maintained in the rear conduits, the bar being equipped at each of its ends with a member for locking the translation of the bar and hinging one of the back wheels, the lateral edges having an upper profile along the contour of one of the back wheels over a particular angular portion of between 15° and 75°, and two front movement members each including at least one steerable front wheel.

10. The vehicle according to claim 9, wherein the back wheels each include an outer rolling ring made from molded plastic, connected to a hinge member by fins bearing on the water narrowing in a junction portion with the outer rolling ring so as to leave an empty space opposite the guide shoe of said wheel, the seat including a boss formed under the seat portion, an open hollow plug is made in the boss toward the front and a handle made behind the backrest, a float for stabilizing the vehicle in the water being attached to said handle and the hollow plug.

11. The vehicle according to claim 4, including two rear movement members each having a back snow ski secured, by a rod, to a cylindrical portion hinged in one of the rear conduits, the rod being secured on the other hand to a branch rising above the seat and ending with a handle for steering each back ski, and two front movement members each including at least one front snow ski.

12. The vehicle according to claim 4, wherein the rear movement member includes two water skis, the front movement member including at least one front water ski which extends from front to back and arranged under a middle portion of the vehicle.

13. The vehicle according to claim 4, wherein the vehicle includes blind threaded housings embedded in the seat, provided laterally relative to the seat portion, the threaded housings being provided on either side of the front of the seat portion to fasten a belt or strap for holding a user's knees.

14. A method for producing the vehicle according to claim 1, including the steps of:
    providing a single piece of plastic, and
    forming the seat to be hollow by rotational molding the single piece of plastic.

15. The method for manufacturing the vehicle according to claim 14, including additional steps of:
    forming at least one partition portion in the seat, and
    marking the at least one partition portion with a raised inscription or drawing.

* * * * *